Reissued Feb. 22, 1944 Re. 22,446

UNITED STATES PATENT OFFICE 22,446

POLYMERIZED RESINS

Vanderveer Voorhees, Homewood, Ill., assignor to Standard Oil Company, Chicago, Ill., a corporation of Indiana No Drawing. Original No. 2,259,671, dated October 21, 1941, Serial No. 165,153, September 22, 1937. Application for reissue March 30, 1942, Serial No. 436,924

6 Claims. (Cl. 260—80)

This invention relates to the manufacture of high molecular weight organic polymers and particularly synthetic rubber-like products. One object of the invention is to produce rubber-like products having certain desirable properties not found in natural rubber. Another object of the invention is to produce synthetic rubber-like resins which are capable of vulcanization with sulfur, sulfur chloride, etc. Other objects of the invention will be apparent from the following description.

It is well-known that liquid isobutylene may be polymerized by the action of certain catalysts such as anhydrous aluminum chloride, boron fluoride, etc., to produce high molecular weight polymers which vary in consistency from viscous oils to soft resins solid at ordinary temperature. The soft resins produced in this manner are usually formed by conducting the polymerization at low temperatures, well below 0° F. and usually of the order of —100° F. The solid resins thus obtained have many of the properties of natural gum rubber, particularly elasticity. In addition they may be made quite colorless. They are soluble in many of the ordinary hydrocarbon solvents in somewhat the same manner as natural gum rubber.

One of the important differences, however, between the isobutylene polymers and natural rubber is their unreactivity toward sulfur and other vulcanizing agents and therefore they cannot be used for the multitudinous purposes to which ordinary rubber is applicable.

I have now discovered a process whereby this deficiency of isobutylene polymers may be overcome. As the starting material in my process I employ a halogenated derivative of isobutylene which I subject to much the same polymerization reaction in the presence of a catalyst, thereby producing a halogenated polymer having the halogen atoms uniformly distributed throughout the polymer molecule. By controlling the polymerization conditions I have succeeded in producing polymers containing twenty or more molecules of the starting material in the polymer molecule and there are indications that as many as fifty or one hundred molecules may be combined to form solid plastic resins similar to those obtained from liquid isobutylene.

The chlorine-containing polymer obtained in this manner may be employed for numerous purposes, for example as a plasticizing agent in rubber, as a coating or impregnating agent for fabrics, paper, etc., as an addition agent to other resins in the manufacture of varnishes, lacquers, etc., but I prefer to convert it into a form which may be vulcanized to produce products to resemble vulcanized natural rubber.

This may be done by dehalogenating the polymer with a suitable dehalogenating agent such as sodium hydroxide, sodium ethylate, ammonia, etc. It is not necessary to completely dehalogenate the product but it is desirable to produce sufficient unsaturation in the polymer molecule to render it vulcanizable by the usual vulcanizing agents. Instead of dehalogenating the polymer I may also combine it with finely dispersed metal sulfide which may exchange sulfur for halogen in the polymer molecule and thus effect the desired vulcanization when the compound is heated.

As an example of my process a quantity of gamma chlorisobutylene (boiling point about 162° C.) was saturated with boron fluoride gas at a temperature of —80° F. and maintained at this low temperature for about nine days. At the end of this time the product was neutralized and washed with water and the unreacted chlorisobutylene was removed by distillation. A 95% yield of an extremely viscous polymer was obtained was found to be practically insoluble in mineral oil. By impregnating fibrous materials with this product they may be rendered impervious to both oil and water.

By removing hydrochloric acid from the above mentioned polymer by heating with sodium hydroxide solution an unsaturated polymer is obtained which may be compounded wtih sulfur and vulcanized in the manner usual for the vulcanization of rubber, enabling the material to be made into elastic molded products. The chlorine containing polymer may also be compounded with natural rubber and other ingredients, for example, zinc sulfide, zinc oxide, antimony sulfide, carbon black, sulfur, etc., in the ordinary vulcanization process, using for example 10 to 100% of the chlorisobutylene polymer in the mixture based on the amount of natural rubber employed. The dechlorinated chlorisobutylene polymer may also be subjected to the action of sulfur chloride as in the cold vulcanization process. I may also employ powdered metals in compounding my chlorisobutylene polymer, for example zinc dust, aluminum, etc. may be employed and have the effect of reducing the amount of combined chlorine in the chlorisobutylene polymer or the partially dechlorinated polymer. The resulting metal chloride may exert a beneficial polymerizing or promoting effect in the vulcanization of the product.

In the preparation of chlorisobutylene I may conveniently pass isobutylene gas into a solution of hypochlorous acid and thereby produce isobutylene chlorhydrin which I may convert directly into chlorisobutylene by treatment with a dehydrating agent.

Instead of chlorisobutylene I may employ other closely related compounds having the same type structure, with the double bond attached to a tertiary carbon atom. This structure may be represented by the following type formula:

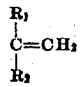

in which $R_1$ is a hydrocarbon radical and $R_2$ is a chlorinated hydrocarbon radical.

Although I have described my invention with respect to a specific example thereof, it should be understood that I contemplate various modifications thereof, such as redistillation of the chlorisobutylene to remove impurities, the use of monochlor, dichlor and higher chlorisobutylenes, the use of brom-isobutylene and fluorisobutylene, the use of other catalysts than $BF_3$ for the polymerization of the halo-isobutylene, for example antimony trichloride, phosphorous trichloride, boron trichloride, etc., either alone or in admixture with other active halides, as promoters. I also contemplate the use of finely divided metals such as powdered aluminum as promoters in the polymerization of chlorisobutylene. I also contemplate fractionating the polymer obtained from chlorisobutylene, preferably by distillation under high vacuum, to separate it into fractions of higher and lower molecular weight and also remove any unchanged chlorisobutylene which may be repolymerized in a new operation. The lower molecular weight fractions may also be subjected to further polymerization with the catalyst, e. g., $BF_3$, or they may be employed for special purposes.

Having thus described my invention, what I claim is:

1. The process which comprises treating gamma-chlorisobutylene with boron trifluoride at a low temperature of about —80° F. and maintaining the mixture at this low temperature for about nine days whereby to effect polymerization of the gamma-chlorisobutylene.

2. In the process of producing a high molecular weight halogen-containing polymer of isobutylene, the steps which comprise treating a chlorinated isobutylene monomer with an active metal halide polymerization catalyst and polymerizing the chlorinated isobutylene at a low temperature of about —80° F., whereby a uniformly chlorinated polymer of said isobutylene is produced.

3. In the process of producing a high molecular weight halogen-containing polymer of isobutylene, the steps which comprise treating a halogenated isobutylene monomer with an active metal halide polymerization catalyst and polymerizing the halogenated isobutylene at a low temperature of about —80° F., whereby a uniformly halogenated polymer of said isobutylene is produced.

4. In the process of preparing a high molecular weight halogen-containing polymer of isobutylene, the steps which comprise treating a halogenated isobutylene monomer with an active metal halide polymerization catalyst and polymerizing the halogenated isobutylene at a low temperature between about —80° F. and about —100° F., thereby producing a halogenated polymer having the halogen atom uniformly distributed throughout the polymer molecule.

5. In the process of preparing a high molecular weight halogen-containing polymer of isobutylene, the steps which comprise treating a chlorinated isobutylene monomer with an active metal halide polymerization catalyst and polymerizing the chlorinated isobutylene at a low temperature between about —80° F. and about —100° F., thereby producing a chlorinated polymer having the chlorine atoms uniformly distributed throughout the polymer molecule.

6. The process of producing a high molecular weight chlorine-containing polymer comprising treating gamma chlorisobutylene with an active metal halide polymerization catalyst at a low temperature of about —80° F., maintaining said low temperature during the polymerization reaction and removing the catalyst from the resulting viscous polymer product.

VANDERVEER VOORHEES.